US011255274B2

(12) United States Patent
Simon et al.

(10) Patent No.: US 11,255,274 B2
(45) Date of Patent: Feb. 22, 2022

(54) SUN GEAR FOR A MECHANICAL REDUCTION GEAR OF AN AIRCRAFT TURBINE ENGINE

(71) Applicant: SAFRAN TRANSMISSION SYSTEMS, Colombes (FR)

(72) Inventors: Adrien Louis Simon, Moissy-Cramayel (FR); Jean-Charles Michel Pierre Di Giovanni, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 89 days.

(21) Appl. No.: 16/792,041

(22) Filed: Feb. 14, 2020

(65) Prior Publication Data

US 2020/0263612 A1    Aug. 20, 2020

(30) Foreign Application Priority Data

Feb. 20, 2019   (FR) ..................................... 1901716

(51) Int. Cl.
| F16H 57/04 | (2010.01) |
| F02C 7/36 | (2006.01) |
| F01D 25/18 | (2006.01) |
| F16H 57/08 | (2006.01) |
| F02C 7/06 | (2006.01) |

(52) U.S. Cl.
CPC ............... *F02C 7/36* (2013.01); *F01D 25/18* (2013.01); *F16H 57/0479* (2013.01); *F16H 57/082* (2013.01); *F02C 7/06* (2013.01); *F05D 2220/323* (2013.01); *F05D 2230/60* (2013.01); *F05D 2260/40311* (2013.01); *F05D 2260/98* (2013.01); *F16H 2057/085* (2013.01)

(58) Field of Classification Search
CPC ......... F02C 7/36; F01D 25/18; F16H 57/0479
See application file for complete search history.

(56) References Cited

U.S. PATENT DOCUMENTS

| 5,433,674 A * | 7/1995 | Sheridan | ................... F01D 5/02 |
| | | | 475/346 |
| 6,007,448 A | 12/1999 | Hotta et al. | |
| 2016/0003090 A1 * | 1/2016 | Lin | .......................... F02C 7/36 |
| | | | 60/39.08 |

FOREIGN PATENT DOCUMENTS

| EP | 0752077 A1 | 1/1997 |
| EP | 1783344 A1 | 5/2007 |

OTHER PUBLICATIONS

Rapport de Recherche Préliminaire, dated Nov. 19, 2019, issued in corresponding French Application No. 1901716 filed Feb. 20, 2019, 12 pages.

* cited by examiner

*Primary Examiner* — Derek D Knight
(74) *Attorney, Agent, or Firm* — Christensen O'Connor Johnson Kindness PLLC

(57) ABSTRACT

A sun gear for a mechanical reduction gear of a turbine engine, in particular for aircraft, the sun gear having a general annular shape about an axis and comprising at the outer periphery thereof, a meshing gearing with planet gears of the reduction gear, and at the inner periphery thereof, splines for coupling with an input shaft of the reduction gear, characterised in that the sun gear has a staged profile in axial cross-section, and preferably comprises an annular recess opening radially inwards and configured to receive at least one oil jet.

13 Claims, 5 Drawing Sheets

SUN GEAR FOR A MECHANICAL REDUCTION GEAR OF AN AIRCRAFT TURBINE ENGINE

TECHNICAL FIELD

Embodiments of the present disclosure relate to the field of mechanical reduction gears for turbine engines, in particular for aircraft.

BACKGROUND

The state of the art comprises, in particular documents WO-A1-2010/092263, FR-A1-2987-416, FR-A1-3041-054, EP-A1-0752077, EP-A1-1783344, US-A1-2016/003090 and US-A-6007448.

The role of a mechanical reduction gear is to modify the speed ratio and the torque between the input axis and the output axis of a mechanical system.

New generations of bypass turbine engines, in particular those having a high dilution rate, comprise a mechanical reduction gear to drive the shaft of a fan. Usually, the reduction gear aims to transforming the rotation speed termed rapid rotation speed of a power turbine shaft into a slower rotation speed for the shaft driving the fan.

One such reduction gear comprises a central pinion, termed sun gear, a ring gear and pinions termed planet gears, which are engaged between the sun gear and the ring gear. The planet gears are supported by a chassis termed planet carrier. The sun gear, the ring gear and the planet carrier are planetary gear train, because the axes of rotation thereof coincide with the longitudinal axis X of the turbine engine. The planet gears each have a different axis of revolution, evenly distributed over the same operating diameter about the planetary gear train axis. These axes are parallel to the longitudinal axis X.

There are several reduction gear architectures. In the state of the art of bypass turbine engines, reduction gears are of the planetary or epicyclic type. There are, in other similar applications, architectures termed differential or "compound".

In a planetary reduction gear, the planet carrier is fixed and the ring gear constitutes the output shaft of the device which rotates in the reverse direction to the sun gear.

In an epicyclic reduction gear, the ring gear is fixed and the planet carrier constitutes the output shaft of the device which rotates in the same direction as the sun gear.

In a differential reduction gear, no element is fixed in rotation. The ring gear rotates in the opposite direction to the sun gear and the planet carrier.

Reduction gears can comprise one or more meshing stages. This meshing is achieved in different manners, such as by contact, by friction or also by magnetic fields. There are several types of meshing by contact such as spur or chevron gearing.

The present disclosure proposes an improvement of a reduction gear with a simple, effective and economical solution, in particular to improve the circulation and the evacuation of oil in the sun gear of this reduction gear.

SUMMARY

Embodiments of the present disclosure relate to a sun gear for a mechanical reduction gear of a turbine engine, and in particular a mechanical reduction gear of an aircraft turbine engine. In an embodiment, the sun gear has a general annular shape around an axis X and comprises at the outer periphery thereof, a meshing gearing with planet gears of the reduction gear, and at the inner periphery thereof, first coupling splines with an input shaft of the reduction gear. In some embodiments, the sun gear has, in the axial cross-section, a staged profile and comprises at least three adjacent axial sections, among which a first section comprising a first inner centring cylindrical surface having a diameter D1, a second section comprising a second inner centring cylindrical surface having a diameter D2, and a third section extending axially between the first and second sections and comprising the first splines with an inner diameter D3 between D1 and D2.

The disclosure thus proposes a solution which provides several advantages in terms of mounting, centering and lubricating the sun gear. From a mounting standpoint, an input shaft of the reduction gear can be engaged in the sun gear by simple axial translation. The cylindrical surfaces of the sun gear are intended to engage with complementary surfaces of the input shaft to ensure the centring of the sun gear. The splines extend between the centring cylindrical surfaces and can receive operating lubrication oil. One of the cylindrical surfaces has an inner diameter less than that of the splines and can be situated at the inner periphery of a side wall for retaining the oil at the level of the splines.

The sun gear according to the disclosure can comprise one or more of the following features, taken individually from one another, or combined with one another:
- the sun gear comprises, at one of its axial ends, an annular recess opening radially inwards and configured to receive at least one oil jet,
- the first section comprises an annular row of first bores or notches configured to enable the passage of oil, in particular towards the splines,
- the recess is formed by an annular edge of the first section, the first bores being in fluid communication with this recess and being configured to supply the first splines with oil,
- the first bores are substantially parallel with the axis X or are inclined with respect to the axis X,
- the second section comprises an annular row of second bores configured to enable the flow of oil, in particular to evacuate the lubrication oil from the splines,
- the second bores are inclined with respect to the axis X; the first and second bores therefore ensure respectively the supply and the evacuation of oil to and from the splines; the evacuation of oil through the second bores avoids an overpressure which would risk axially pushing the input shaft, due to the low clearances between the centring surfaces,
- the sun gear comprises, between the second and third sections, an annular mounting groove of a ring, this ring having a predetermined inner diameter D5 and being configured to maintain a predetermined oil level at the level of the first splines; this ring makes it possible to ensure a predetermined oil level at the level of the splines; this ring thus forms another side wall for retaining the oil at the level of the splines,
- the ring is preferably elastically deformable or flexible,
- the third portion comprises inner cylindrical surfaces situated upstream and downstream from the first splines.

The present disclosure also relates to a mechanical reduction gear of a turbine engine, in particular a mechanical reduction gear of an aircraft turbine engine. In an embodiment, the reduction gear comprises a cage wherein is mounted a sun gear such as described above, a ring gear extending around the sun gear and the cage, and planet gears arranged in the cage and meshed with the sun gear and the ring gear, these planet gears being supported by a planet carrier.

The reduction gear can further comprise a lubrication oil dispenser comprising fixing lugs (19) on the cage.

Advantageously, the planet gears are separated from one another by oil deflectors secured with the cage, at least one of these deflectors comprising an oil sprinkler configured to project an oil jet in the direction of the sun gear. In an embodiment, the oil jet is oriented tangentially into an annular recess of the sun gear, the oil jet being oriented in the direction of rotation of the sun gear, which makes it possible to limit oil splashes.

The disclosure also relates to an assembly comprising a reduction gear and an input shaft. In an embodiment, the input shaft comprises a portion engaged axially in the sun gear and comprising at the outer periphery thereof, second coupling splines with the first splines of the sun gear. In an embodiment, the portion of the input shaft has, in the axial cross-section, a staged profile and comprises at least three adjacent axial segments among which a first segment comprising a first outer centring cylindrical surface having a diameter D1 and configured to cooperate with the first inner centring cylindrical surface, a second segment comprising a second outer centring cylindrical surface having a diameter D2 and configured to cooperate with the second inner centring cylindrical surface, and a third segment extending axially between the first and second segments and comprising the second splines with an inner diameter D4 of between D1 and D2.

The third segment can comprise pre-splines situated upstream from the second splines.

The disclosure furthermore relates to a turbine engine, in particular of aircraft, comprising a mechanical reduction gear or an assembly such as described above.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
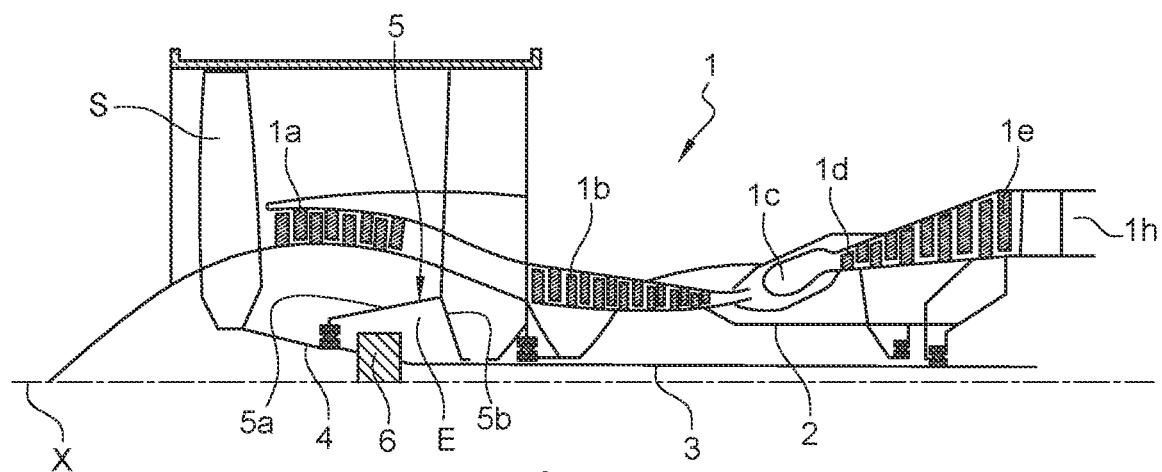
FIG. 1 is a schematic, cross-sectional, axial view of a representative turbine engine using one or more aspects of the present disclosure.

FIG. 1 describes a turbine engine 1 which comprises, a fan S, a low-pressure compressor 1a, a high-pressure compressor 1b, an annular combustion chamber 1c, a high-pressure turbine 1d, a low-pressure turbine 1e and an exhaust pipe 1h. The high-pressure compressor 1b and the high-pressure turbine 1d are connected by a high-pressure shaft 2 and form with it a high-pressure (HP) body. The low-pressure compressor 1a and the low-pressure turbine 1e are connected by a low-pressure shaft 3 and form with it a low-pressure (LP) body.

The fan S is driven by a fan shaft 4 which is driven by the LP shaft 3 by a reduction gear 6. This reduction gear 6 is generally of the planetary or epicyclic gear train type.

Although the following description relates to a reduction gear of the planetary or epicyclic gear train type, it is also applicable to a mechanical differential wherein the three components, which are the planet carrier, the ring gear and the sun gear, are rotatable, the rotation speed of one of these components depending in particular on the difference in the speeds of the two other components.

The reduction gear 6 is positioned in the front portion of the turbine engine. A fixed structure schematically comprising, here, an upstream portion 5a and a downstream portion 5b which forms the engine casing or stator 5 is arranged so as to form an enclosure E surrounding the reduction gear 6. This enclosure E is here closed upstream by seals at the level of a bearing making it possible for the fan shaft 4 to pass through, and downstream by seals at the level of the cross member of the LP shaft 3.

Figure 2:
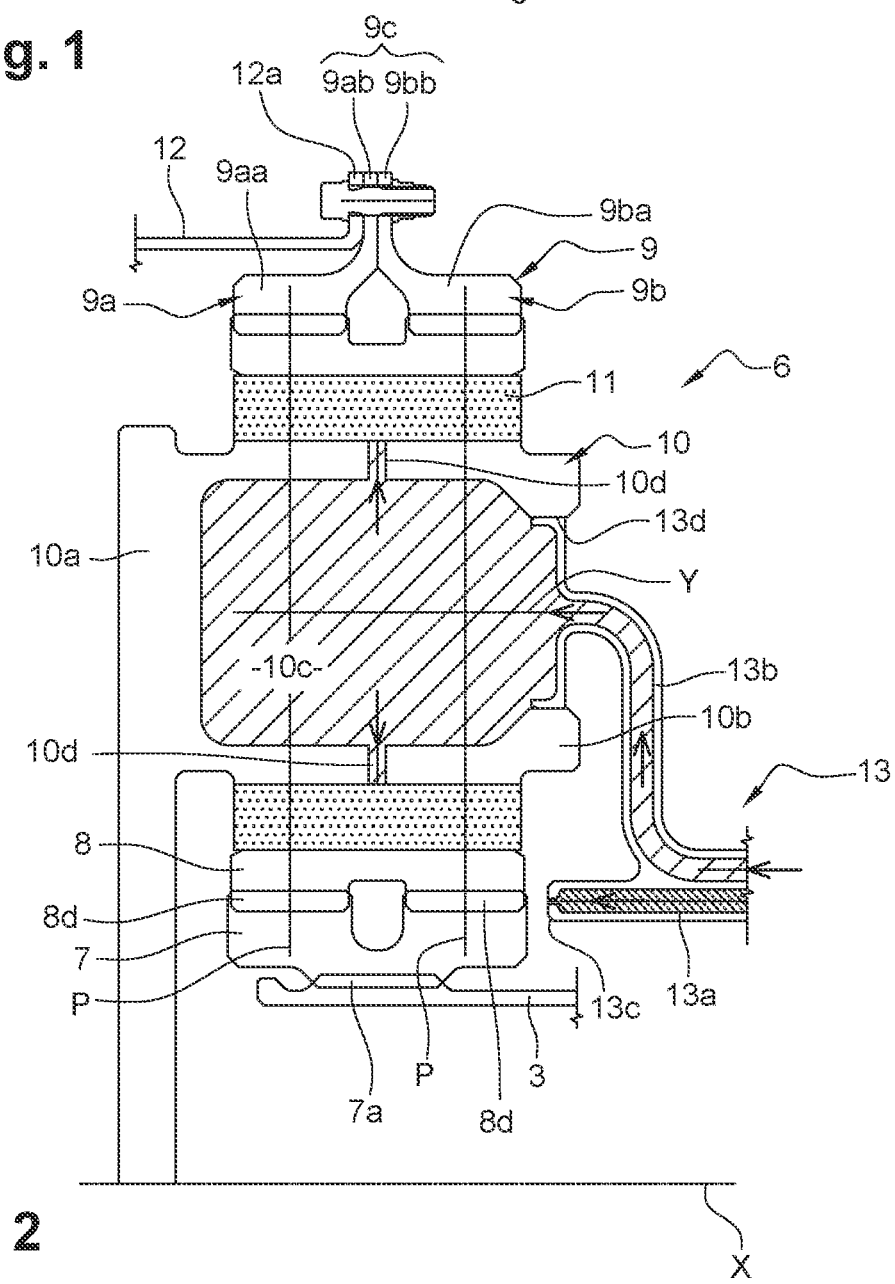
FIG. 2 is a schematic, partial, cross-sectional, axial view of a representative mechanical reduction gear according to an embodiment of the present disclosure.

FIG. 2 shows a reduction gear 6 which can take the form of different architectures in which some parts are fixed or rotating. At the input, the reduction gear 6 is connected to the LP shaft 3, for example by way of inner splines 7a. Thus, the LP shaft 3 drives a planetary pinion termed the sun gear 7. The sun gear 7, of which the axis of rotation is coincident with that of the turbine engine X, drives a series of pinions termed planet gears 8, which are evenly distributed over the same diameter about the axis of rotation X. This diameter is equal to twice the operating distance between the sun gear 7 and the planet gears 8. The number of planet gears 8 is generally defined between three and seven for this type of application.

All of the planet gears 8 are supported by a chassis termed planet carrier 10. Each planet gear 8 rotates about its own axis Y, and meshes with the ring gear 9.

At the output, the following occurs:

In an epicyclic gear train configuration, all of the planet gears 8 drive in rotation the planet carrier 10 about the axis X of the turbine engine. The ring gear is fixed to the engine casing or stator 5 via a ring gear carrier 12 and the planet carrier 10 is fixed to the fan shaft 4.

In a planetary gear train configuration, all of the planet gears 8 are supported by a planet carrier 10, which is fixed to the engine casing or stator 5. Each planet gear drives the ring gear which is attached to the fan shaft 4 via a ring gear carrier 12.

Each planet gear 8 is mounted free to rotate using a bearing 11, for example of the roller or hydrostatic bearing type. Each bearing 11 is mounted on one of the axes 10b of the planet carrier 10 and all the axes are positioned against one another using one or more structural chassis 10a of the planet carrier 10. There is a number of axes 10b and of bearings 11 equal to the number of planet gears. For operating, mounting, production, control, repair or replacement reasons, the axes 10b and the chassis 10a can be separated into several parts.

For the reasons cited above, the gearing 8d of a reduction gear can be separated into several helices, each having a median plane P. In this example, the operation of a reduction gear with several helices with a ring gear separated into two half-ring gears is detailed:

A front half-ring gear 9a consisting of a rim 9aa and a half-mounting flange 9ab. On the rim 9aa is located the front helix of the gearing of the reduction gear. This front helix meshes with that of the planet gear 8, which meshes with that of the sun gear 7.

A rear half-ring gear 9b consisting of a rim 9ba and a half-mounting flange 9bb. On the rim 9ba is located the rear helix of the gearing of the reduction gear. This rear helix meshes with that of the planet gear 8, which meshes with that of the sun gear 7.

If the helix widths vary between the sun gear 7, the planet gears 8 and the ring gear 9 due to overlapping of the teeth, they are all centred on a median plane P for the front helices and on another median plane P for the rear helices. In the case of a roller bearing with two rows of rollers, each row of rolling elements is also centred on two median planes.

The half-mounting flange 9ab of the front ring gear 9a and the half-mounting flange 9bb of the rear ring gear 9b form the mounting flange 9c of the ring gear. The ring gear 9 is fixed to a ring gear carrier by assembling the mounting flange 9c of the ring gear and the mounting flange 12a of the ring gear carrier using a bolted mounting, for example.

The arrows of FIG. 2 describe the pathway of the oil in the reduction gear 6. The oil arrives in the reduction gear 6 from the stator portion 5 in the dispenser 13 by different means (e.g., conduits, passageways, pipes, etc.) which will not be specified in this view, as they are specific to one or more types of architecture. The dispenser is separated into 2 portions, each generally repeated with the same number of planet gears. The injectors 13a have the function of lubricating the gearings and the arms 13b have the function of lubricating the bearings. The oil is brought towards the injector 13a to exit through the end 13c in order to lubricate the gearings. The oil is also brought towards the arm 13b and circulates via the supply mouth 13d of the bearing. The oil then circulates through the axis in one or more of the buffer zones 10c to then exit through the orifices 10d in order to lubricate the bearings of the planet gears.

Figure 3:
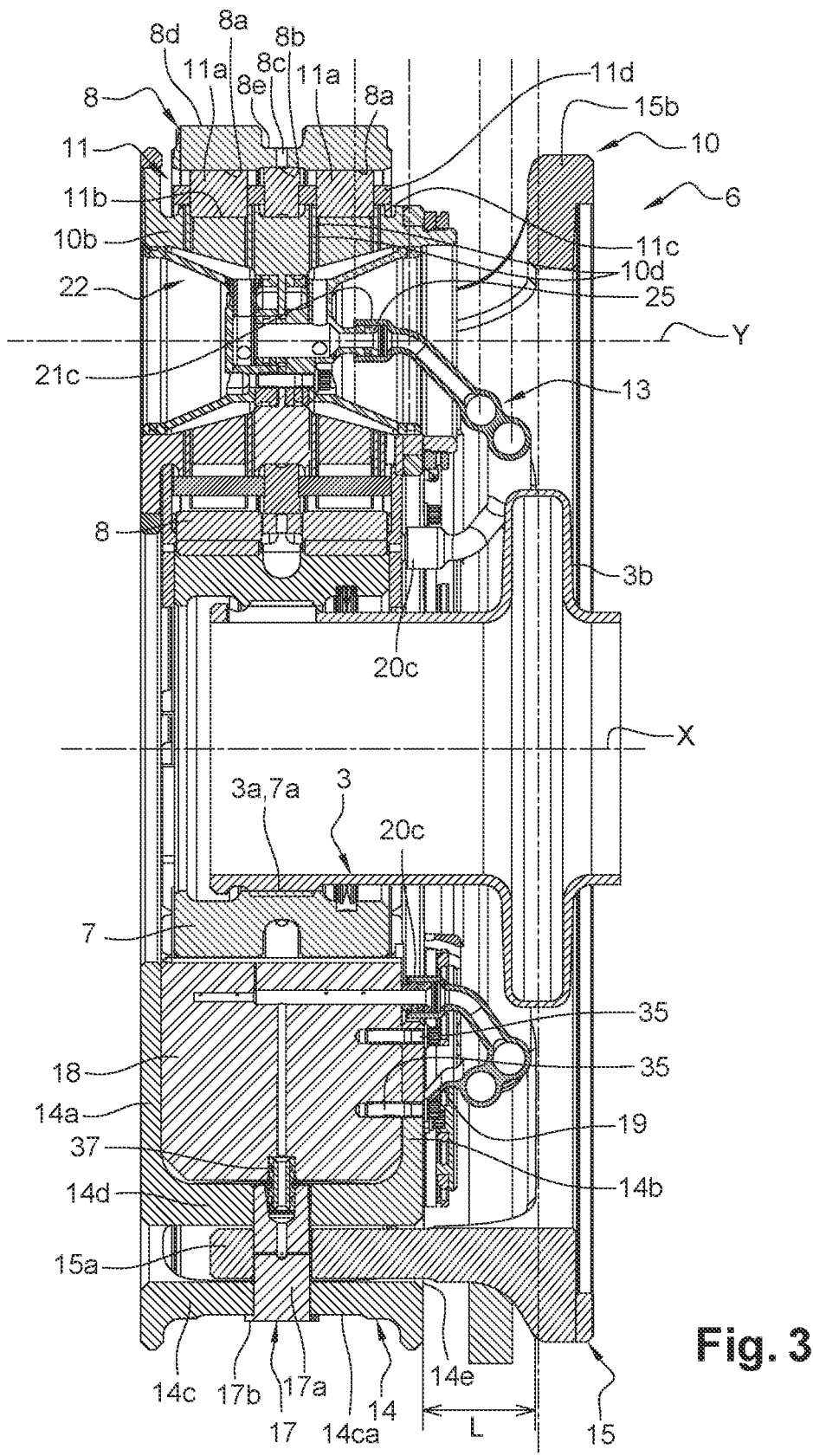
FIG. 3 is a cross-sectional view of a representative mechanical reduction gear according to an embodiment of the present disclosure.

FIG. 3 represents a more detailed example of a reduction gear 6. The planet carrier 10 of the reduction gear 6 of FIG. 3 is of the cage 14 and cage carrier 15 type, the cage 14 and the cage carrier 15 being connected by bearings.

The cage 14 comprises two radial annular walls 14a, 14b extending about the axis X, these walls 14a, 14b being parallel and being respectively a front radial wall 14a and a rear radial wall 14b. The walls 14a, 14b are connected together at the outer peripheries thereof by pairs of bridges 14c, 14d, regularly distributed about the axis X. These pairs of bridges ensure a structural connection between the walls 14a, 14b. Each pair of bridges comprises two bridges, respectively radially outer 14c and radially inner 14d, which extend substantially parallel along the axis X at a radial distance from one another.

The pairs of bridges 14c, 14d together define spaces which extend circumferentially about the axis X and are delimited axially by the outer peripheral edges of the walls 14a, 14b. There are 5 pairs of bridges in the example shown.

Each pair of bridges forms a clevis to receive a finger 15a of the cage carrier 15. In other words, the bridges of each pair together define a housing for receiving a finger 15a of the cage carrier 15. Oblong openings 14e are provided in the rear wall 14b so as to allow the fingers 15a to pass between the bridges 14c, 14d. The wall 14a can comprise similar openings aligned axially with the openings 14e of the wall 14b.

The number of fingers 15a is equal to the number of pairs of bridges 14c, 14d and is five in the example shown. These fingers 15a extend protruding axially upstream from a ring 15b of the cage carrier 15 extending about the axis X. The fingers 15a of the cage carrier 15 are engaged in the inter-bridge housings by axial translation from the rear, through the openings 14e of the wall 14b.

Each finger 15a comprises, substantially in the middle thereof, a recess for mounting a ball (not represented) intended to be passed through by a cylindrical pin 17 carried by each pair of bridges 14c, 14d. Each pin 17 passes through the inter-bridge housing and has an orientation, substantially radial with respect to the axis X. Each pin 17 comprises a cylindrical body 17a connected by an end, here radially outer, to a collar 17b. The pin 17 is here engaged by radial translation from the outside through radial orifices of the bridges 14c, 14d, the collar 17b thereof being intended to radially bear on a flat face 14ca of the outer bridge 14c. After insertion of the pin 17 in the orifices of the bridges, until the collar 17b bears against the outer bridge, the collar 17b is fixed to this bridge, for example, by screwing.

As can be seen in the figures, in an assembled position, the ring 15b of the cage carrier 15 is offset axially by a predetermined distance L from the rear wall 14b facing the cage 14 (FIG. 3).

The cage 14 defines an inner housing for receiving the sun gear 7 of axis X, planet gears 8 arranged around the sun gear 7 and meshed therewith, as well as deflectors 18.

As described above in relation to FIG. 2, the sun gear 7 comprises inner splines 7a for coupling to complementary outer splines 3a of the LP shaft 3 (FIG. 3). It can be observed that the splines 3a are situated on an upstream portion of the LP shaft 3 which comprises a gusset-shaped downstream portion 3. This portion 3b is here situated in a plane perpendicular to the axis X which is offset axially from the cage 14 of the planet carrier 10 and which passes substantially through the ring 15b of the cage carrier 15. This portion 3b gives the LP shaft 3 a certain flexibility limiting the transmission of the forces of the operating engine.

The reduction gear 6 comprises a lubrication oil dispenser 13. The dispenser 13 has a general annular shape about the axis X and is formed of a single part. It is here attached and fixed on the planet carrier 10 and comprises, for this, lugs 19 for fixing on the cage 14 of the planet carrier and in particular, on the rear wall 14b thereof.

The dispenser 13 comprises oil outlets 20c which are connected to the deflectors 18 in view of the oil supply thereof. The dispenser 13 further comprises oil outlets 21c which are connected to lubrication and cooling cores 22. The cores 22 have the function of lubricating and cooling the axes 10b of the planet gears 8 which are here centred and guided by the bearings 11 with rollers 11a.

Each axis 10b is guided by a double roller bearing 11, here with two rows of rollers 11a. The two rows extend about the same axis which coincides with that, referenced Y, of the axis 10b of the planet gear 8.

In some embodiments, the rollers 11a are guided in tracks defined by inner and outer rings. In the examples represented, a feature is linked to the fact that the inner rings for guiding the rollers 11a are integrated to the axis 10b. The outer periphery of the axis 10b thus comprises cylindrical roller tracks 11b of the rollers 11a, each track 11b being delimited axially by annular grooves 11c which themselves are used to guide cages 11d for maintaining the rollers 11a. Moreover, FIG. 3 makes it possible to see that the outer rings are integrated to the inner periphery of the planet gears 8. The inner periphery of the planet gears 8 thus comprises cylindrical roller tracks 8a of the rollers 11a, the tracks 8a being separated from one another by an annular groove 8b opening radially inwards and at the bottom of which are formed radial bores 8c for the passage of oil.

The outer periphery of each planet gear 8 comprises a double helix gearing 8d, i.e. two coaxial and adjacent helices which are here separated from one another by an annular groove 8e opening radially outwards and at the bottom of which the bores 8c open.

The inner periphery of the axis 10b of each planet gear 8 has a general biconical shape and comprises an annular flange for mounting a lubrication core 22.

Orifices 10d for the passage of oil pass through the axes 10b in the radial direction, and therefore extend between the inner and outer peripheries thereof.

The core 22 comprises a connecting tube 25 centred on the axis Y and forming a male connector intended to receive a female connector of an outlet 21c of the dispenser 13 by press-fitting. In a variant, the tube 25 could form a female connector.

Figure 4:
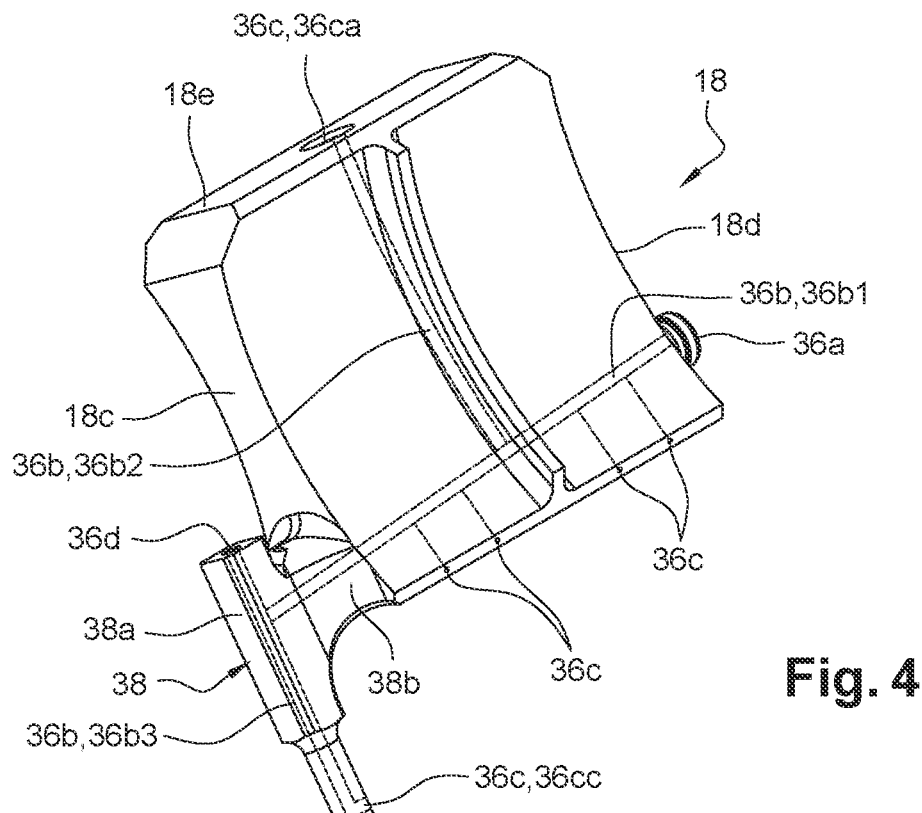
FIG. 4 is a perspective view of one of the oil deflectors of the reduction gear of FIG. 3.

FIGS. 3 and 4 show deflectors 18 of the reduction gear 6. As stated above, the reduction gear 6 comprises several deflectors 18 which are housed in the cage 14 and are each arranged between two adjacent planet gears 8. The number of deflectors 18 of the reduction gear 6 is thereof equal to the number of planet gears 8 of this reduction gear.

The first function of a deflector 18 is to guide the lubrication oil from the gearings of the planet gears 8 and to avoid the recirculation of oil between planet gears, hence the notion of "inter-planet gear deflector" The deflectors 18 are thus shaped to mould the peripheral shape of the planet gears 8.

In addition to extending between two adjacent planet gears 8, each deflector 18 is situated between the sun gear 7 on the one hand, located radially inside, and a pair of bridges 14c, 14d, on the other hand, located radially outside (FIG. 3).

The deflectors 18 extend between the radial walls 14a, 14b of the cage 14 and have faces 18c, 18d which bear on the inner faces facing these walls 14a, 14b. The deflectors 18 are fixed to the cage 14 by screws 35, for example. Each block can comprise, for example, on the rear face 18d thereof, tapped holes for receiving screws 35 for fixing the deflector to the rear wall 14b of the cage 14. An identical configuration on the wall 14a is also possible.

Each deflector 18 comprises an integrated lubrication circuit, which comprises an oil inlet 36a connected by bores 36b to at least one oil outlet 36c. In the example represented, the oil inlet 36a is situated on the rear face 18d and comprises a tube intended to form a male connector and to engage by male/female press-fitting with an outlet 20c of the dispenser 13 described above. Even if a connector is presented below as male and intended to engage with a female connector, it can, in a variant, be replaced by a female connector intended therefore to engage with a male connector, and vice versa (FIG. 3).

Each deflector 18 comprises at least one outlet 36c which is presented in the form of an orifice 36ca forming a female connector which is intended to receive a sealed fluid connection socket 37 (FIG. 3). Like the inlet 36a, the socket 37 can be removed and replaced by a male connector. This orifice 36ca is here situated on an upper face 18e of each deflector. FIG. 3 makes it possible to see that one half of the socket 37 is engaged by male/female press-fitting in the orifice 36ca and that the other half is engaged by male/female press-fitting in a female orifice provided at the radially inner end of the body 17a of the pin 17 carried by a pair of bridges 14c, 14d. This same FIGURE shows that the inlet 36a is connected by two bores 36b1, 36b2 at the outlet 36c. These bores are perpendicular, a first bore 36b1 extending about the axis X, from the inlet 36a, and a second bore 36b2 extending radially from the first bore to the orifice 36ca.

One of the deflectors 18 comprises a sprinkler 38 intended to project oil towards the sun gear 7. This deflector 18 is the deflector represented in FIG. 4. The sprinkler 38 is formed of one single part with the block of the deflector 18 and has here a general L-shape of which a branch 38a has a radial orientation and of which a branch 38b extends axially and connects the front face 18c of the block at the radially outer end of the branch 38a. The sprinkler 38 extends in a median symmetry plane of the block. The deflectors 18, which do not comprise any sprinkler 38, also have a median symmetry plane, which corresponds to a plane passing through the axis X of the reduction gear 6.

Figure 5:
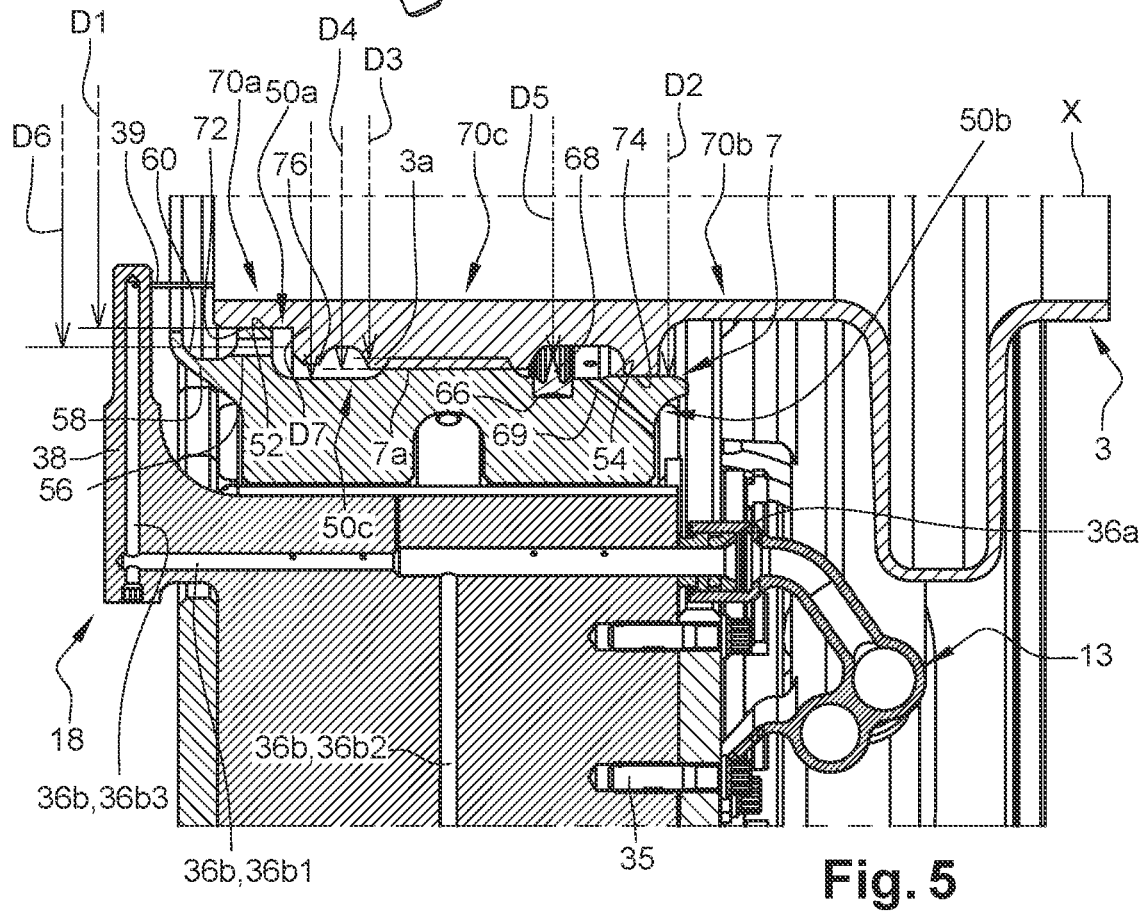
FIG. 5 is a cross-sectional view of an embodiment of the present disclosure and shows the coupling between a sun gear and an input shaft of the reduction gear.
Figure 6:
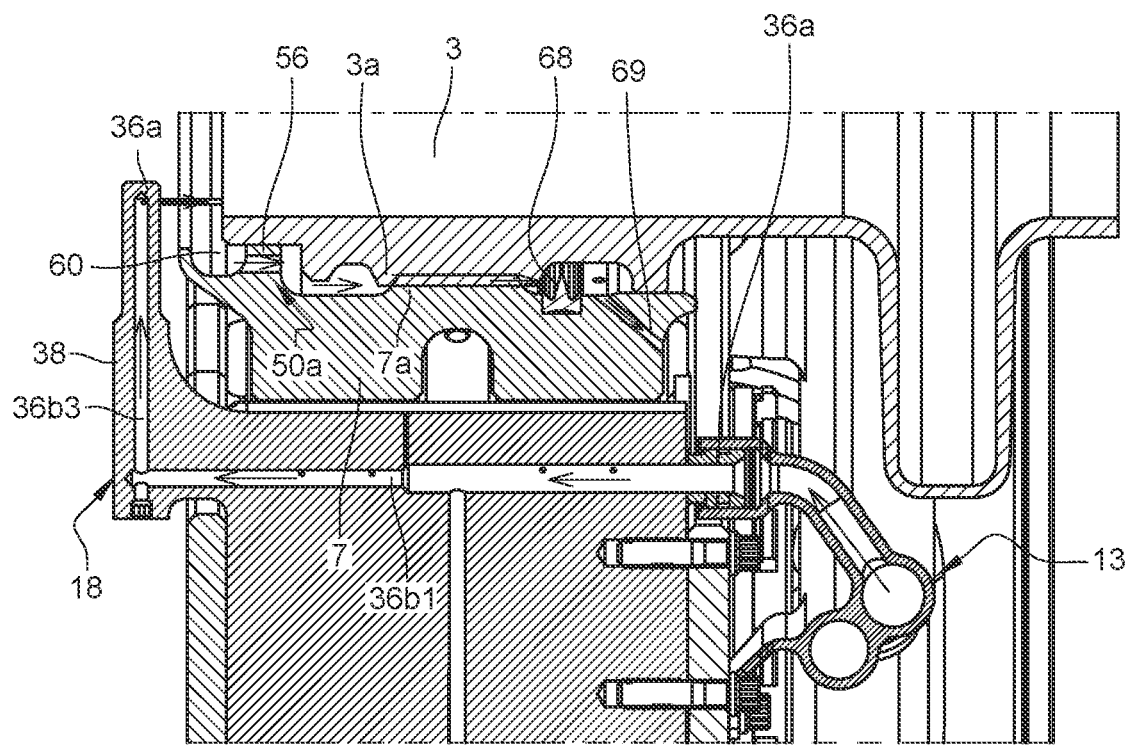
FIG. 6 is a view similar to that of FIG. 5 and showing the pathway of the oil in the operating reduction gear.
Figure 7:
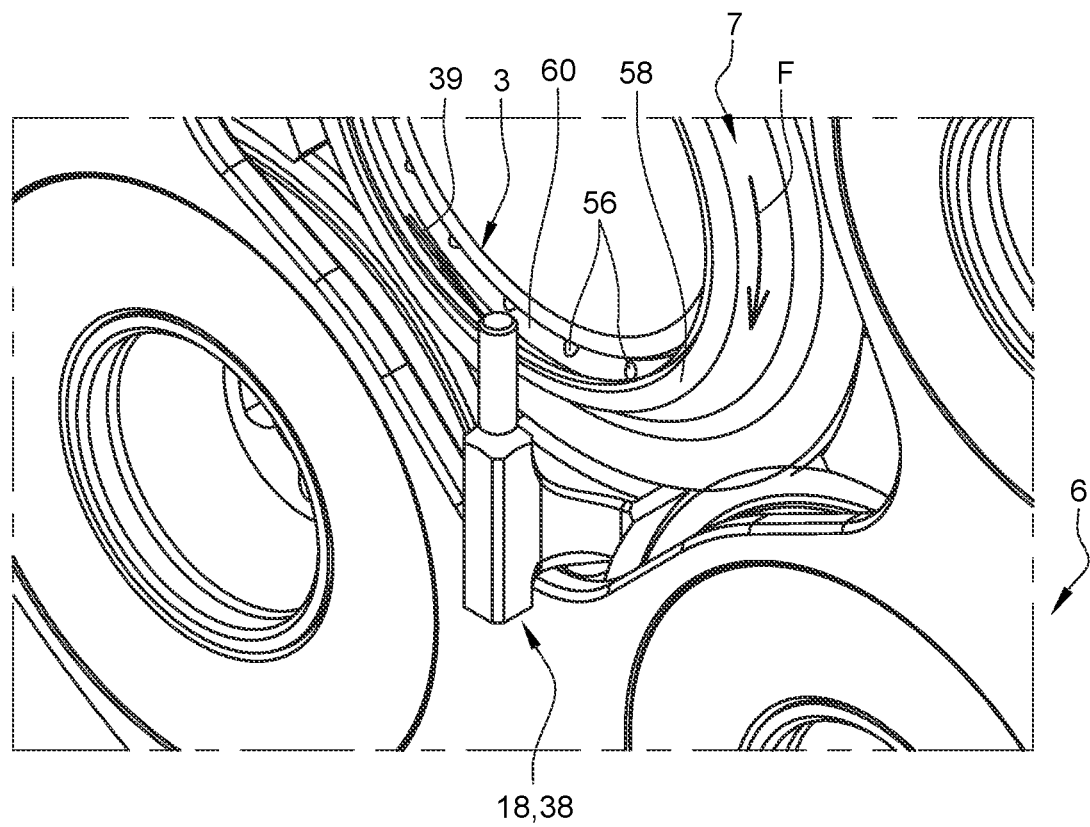
FIG. 7 is an isometric view upstream from the reduction gear of FIG. 5.

The branch 38a extends radially inwards from the branch 38b and the radially inner free end thereof comprises an orifice 36cc oriented rearwards for the projection of oil on the sun gear 7. FIGS. 5, 6 and 7 show the oil jet 39 projected by this sprinkler 38.

The oil supply of the sprinkler 38 is achieved by extending the axial bore 36b1 to the front face 18c of the block of the deflector 18, and in the axial branch 38b (FIG. 4). An additional radial bore 36b3 is provided in the branch 38 to connect this axial bore 36b to the orifice 36cc for projecting oil from the sprinkler. The radially outer end of the bore 36b3 of the sprinkler, which is therefore opposite the orifice 36cc for projecting oil, can be closed by a returned stopper 36d. As can be seen in FIG. 3, the deflectors 18, which do not comprise any sprinkler 38, have a shorter axial bore 36b, i.e. not opening on the front face 18c of the block of the deflector.

According to the disclosure, the sun gear 7 and the LP shaft 3 are of the staged type and are designed to improve the lubrication of the operating splines 7a, 3a thereof.

FIG. 5 depicts a representative embodiment of the sun gear 7 and of the LP shaft 3. The sun gear 7 has an outer periphery as described above. The inner periphery thereof has, in the axial cross-section, a staged profile and comprises at least three adjacent axial sections 50a, 50b, 50c, among which a first section 50a comprising a first inner centring cylindrical surface 52 having a diameter D1, a second section 50b comprising a second inner centring cylindrical surface 54 having a diameter D2, and a third section 50c extending axially between the first and second sections 50a, 50b and comprising splines 7a with an inner diameter D3 of between D1 and D2.

The surface 52 is situated at the inner periphery of a radial wall of the section 50a, this radial wall comprising an annular row of first bores 56. These bores 56 are situated at a circumference of diameter D6. The bores 56 are substantially parallel with the axis X in the example represented. In a variant, the bores could be inclined with respect to the axis X, for example by up to 30° even 60°. Due to the centrifugal forces, the oil flows from the recess 60 through the bores 56 towards the recess 62 of diameter D7. It is therefore more specifically the outer diameter of the bores which can have an impact on the flow of the oil when operating. By analogy, in the case where the bores would be replaced by notches (and therefore by an alternance of solid portions and voids), it would in fact be the outer diameter of the voids of the notches which would impact the flow of the oil through the notches.

The first section 50a further comprises, at the upstream or front thereof, an annular edge 58 having a generally U-shaped cross-section, of which the opening is oriented radially inwards and defines a radially inner annular recess 60. The edge 58 and the recess 60 thereof form an impeller for recovering the oil projected by the sprinkler 38. The bores 56 open at the upstream ends thereof at the bottom of the recess 60 and at the downstream ends thereof at the level of the third section 50c. The bores 56 thus ensure the circulation of oil from the recess 60 up to the splines 7a.

Figure 5A:
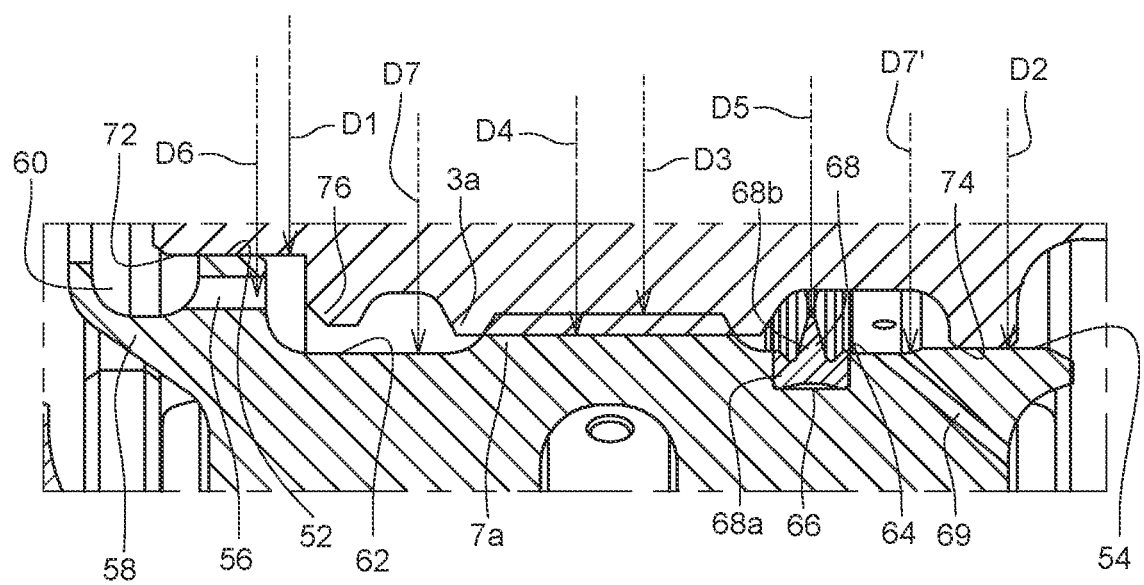
FIG. 5a is a larger scale view of a portion of FIG. 5.

The splines 7a extend over some of the length of axial dimension of the third section 50c, which comprises inner cylindrical surfaces 62, 64 upstream and downstream from the splines (FIG. 5a).

The surface 62 has a diameter D7. The surface 64 has a diameter D7' which is preferably greater than D7, for example, 1 or 2 mm. The diameters D7 and D7' are greater than the diameter D2 of the surface 54. The surface 64 comprises an annular groove 66 for housing an overflow ring 68. This ring 68 has a predetermined inner diameter D5 and is configured to maintain a predetermined level of oil at the level of the splines 7a.

In the example represented, the ring 68 has a generally T-shaped axial cross-section, and comprises a substantially cylindrical branch 68a housed in the groove 66 and a substantially radial branch 68b extending from the branch 68a radially inwards and of which the inner periphery defines the diameter D5.

The second section 50b comprises an annular row of bores 69 configured to enable a flow of oil from upstream to downstream. The bores 69 are inclined with respect to the axis X, from upstream to downstream radially outwards. They open at the upstream ends thereof on the surface 64, i.e. upstream from the surface 54, and at the downstream ends thereof on a radial downstream surface of the sun gear.

The upstream portion of the LP shaft 3 which is engaged axially in the sun gear 7 also has a staged profile in the axial cross-section, and comprises at least three adjacent axial segments 70a, 70b, 70c, among which a first segment 70a comprising an outer centring cylindrical surface 72 having a diameter D1 and configured to cooperate with the inner cylindrical surface 52, a second segment 70b comprising a second outer centring cylindrical surface 74 having a diameter D2 and configured to cooperate with the inner cylindrical surface 54, and a third segment 70c extending axially between the first and second segments 70a, 70b and comprising splines 3a which have an outer diameter D4 between D1 and D2.

In the example represented, pre-splines 76 are situated on the segment 70c upstream from the splines 3a. These splines 76 have a centring function and angular orientation of the sun gear 7 and of the shaft 3 during the respective engagement thereof by axial translation. During this insertion, the pre-splines 76 engage with the downstream ends of the splines 7a of the sun gear to centre and angularly orient the sun gear opposite the shaft, then the latter are engaged in one another by axial translation. In the mounted and coupled position, the splines 3a, 7a are engaged in one another. The pre-splines 76 are not allowed to transmit a rotational torque and are therefore located upstream from the zone for coupling the sun gear 7 and the shaft 3.

In the example represented, D1 is less than D2, and D3 is between D1 and D2. D4 is between D1 and D2, and is greater than D3. D5 is between D1 and D2 and is here furthermore between D3 and D4. D6 is between D1 and D2 and is less than D3. D7 and D7' are greater than the base diameter of the splines 7a of the sun gear.

FIGS. 6 and 7 show the pathway of the oil from the dispenser 13 up to the sun gear 7. The oil penetrates into the dispenser 13 as indicated above, then supplies the deflector 18 through the inlet 36a. The oil circulates in the bores 36b1, 36b3 and up to the orifice 36cc. An oil jet 39 is projected towards the sun gear 7, directly into the recess 60 thereof. The jet is advantageously oriented and positioned so as to limit splashing. It is preferably oriented in the direction of rotation (arrow F in FIG. 7) of the sun gear 7 and substantially tangential to the recess 60. The oil which is projected into the recess 60 is centrifugated then flows through the bores 56 at the level of the splines 3a, 7a to lubricate them. A predetermined level of oil is retained upstream by the radial wall of the first section 50a, and downstream by the ring 68. The excess oil flows radially inside the ring downstream and joins the bores 69 to then be evacuated downstream from the sun gear.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A sun gear for a mechanical reduction gear of an aircraft turbine engine, the sun gear having a general annular shape around an axis, and comprising at the outer periphery thereof, a gearing meshing with planet gears of the reduction gear, and at the inner periphery thereof, first coupling splines with an input shaft of the reduction gear, the sun gear having a staged profile in axial cross-section, and comprising at least three adjacent axial sections among which a first section comprising a first inner centring cylindrical surface having a diameter (D1), a second section comprising a second inner centring cylindrical surface having a diameter (D2), and a third section extending axially between said first and second section and comprising the first splines with an inner diameter (D3) between (D1) and (D2), wherein the sun gear comprises at one of its axial ends an annular recess opening radially inwards and configured to receive at least one oil jet, said first section comprises an annular row of first bores or notches configured to enable a flow of oil, wherein said recess is formed by an annular edge of said first section, the first bores being in fluid communication with this recess and being configured to supply said first splines with oil.

2. The sun gear according to claim 1, wherein said first bores are substantially parallel with the axis (X) or are inclined with respect to the axis (X).

3. The sun gear according to claim 1, wherein said second section comprises an annular row of second bores configured to enable a flow of oil.

4. The sun gear according to claim 3, wherein said second bores are inclined with respect to the axis (X).

5. The sun gear according to claim 1, wherein the sun gear comprises, between said second and third sections, an annular mounting groove of a ring, this ring having a predetermined inner diameter (D5) and being configured to maintain a predetermined oil level at the level of said first splines.

6. The sun gear according to claim 5, wherein the ring is elastically deformable or flexible.

7. The sun gear according to claim 1, wherein said third portion comprises inner cylindrical surfaces situated upstream and downstream from the first splines.

8. A mechanical reduction gear for a turbine engine, comprising: a cage wherein is mounted a sun gear according to claim 1, a ring gear extending around the sun gear and the cage, and planet gears arranged in the cage and meshed with the sun gear and the ring gear, these planet gears being supported by a planet carrier.

9. The reduction gear according to claim 8, wherein the reduction gear further comprises a lubrication oil dispenser, said dispenser comprises lugs for fixing on the cage.

10. The reduction gear according to claim 8, wherein the planet gears are separated from one another by oil deflectors secured with the cage, at least one of these deflectors comprising an oil sprinkler configured to project an oil jet in the direction of the sun gear, and preferably tangentially in an annular recess of the sun gear, the oil jet being oriented in the direction of rotation of the sun gear.

11. An assembly comprising a reduction gear according to claim 8 and an input shaft, this input shaft comprising a portion engaged axially in the sun gear and comprising, at the outer periphery thereof, second coupling splines with the first splines of the sun gear, wherein said portion has, a staged profile in axial cross-section, and comprises at least three adjacent axial segments among which a first segment comprising a first outer centering cylindrical surface having the diameter (D1) and configured to cooperate with said first inner centering cylindrical surface, a second segment comprising a second outer centering cylindrical surface having the diameter (D2) and configured to cooperate with said second inner centering cylindrical surface, and a third segment extending axially between said first and second segments and comprising said second splines of inner diameter (D4) between (D1) and (D2).

12. The assembly according to claim 11, wherein said third segment comprises pre-splines situated upstream from the second splines.

13. A turbine engine for an aircraft, comprising a mechanical reduction gear according to claim 8.

* * * * *